US006486464B1

(12) United States Patent
Ma et al.

(10) Patent No.: US 6,486,464 B1
(45) Date of Patent: Nov. 26, 2002

(54) DOUBLE SHEET DETECTOR METHOD FOR AUTOMATED TRANSACTION MACHINE

(75) Inventors: Songtao Ma, Wadsworth, OH (US); Alexander J. Yeckley, North Canton, OH (US); Edward L. Laskowski, Seven Hills, OH (US)

(73) Assignee: Diebold, Incorporated, North Canton, OH (US)

(*) Notice: Subject to any disclaimer, the term of this patent is extended or adjusted under 35 U.S.C. 154(b) by 0 days.

(21) Appl. No.: 09/375,960

(22) Filed: Aug. 17, 1999

Related U.S. Application Data

(63) Continuation-in-part of application No. 09/135,384, filed on Aug. 17, 1998, which is a continuation-in-part of application No. 08/749,260, filed on Nov. 15, 1996, now Pat. No. 5,923,413.

(60) Provisional application No. 60/107,900, filed on Nov. 10, 1998, and provisional application No. 60/133,613, filed on May 11, 1999.

(51) Int. Cl.[7] .................................................. G01N 9/04

(52) U.S. Cl. ................................ 250/223 R; 250/559.4

(58) Field of Search .......................... 250/223 R, 559.4, 250/559.39, 559.36; 377/8; 235/462.17; 356/71, 381–387, 429–431; 414/791.4

(56) References Cited

U.S. PATENT DOCUMENTS

| | | | | |
|---|---|---|---|---|
| 4,023,011 A | | 5/1977 | Nakajima et al. | |
| 4,352,988 A | | 10/1982 | Ishida | |
| 4,723,072 A | | 2/1988 | Naruse | |
| 5,202,557 A | * | 4/1993 | Robertson | 250/223 R |
| 5,222,729 A | * | 6/1993 | Wallaschkowski | 271/262 |
| 5,923,413 A | * | 7/1999 | Laskowski | 356/71 |
| 6,101,266 A | * | 8/2000 | Laskowski et al. | 382/135 |
| 6,242,733 B1 | * | 6/2001 | Ma et al. | 250/223 R |

* cited by examiner

*Primary Examiner*—Frank G. Font
*Assistant Examiner*—Layla Lauchman
(74) *Attorney, Agent, or Firm*—Ralph E. Jocke; Daniel D. Wasil; Walker & Jocke

(57) ABSTRACT

An automated transaction machine includes apparatus for distinguishing between single sheets and multiple sheets in a sheet path. The apparatus includes radiation emitters (14, 34) and radiation detectors (20, 40, 42). The radiation emitters are operated to emit radiation at periodic intervals. Signal conditioners (50) receive signals from the radiation detectors and generate outputs responsive to the intensities sensed by the detectors substantially only during the periodic intervals. The outputs are combined, weighed and/or compared to thresholds to distinguish single and multiple sheets. The apparatus enables reliable operation in noisy electrical environments and with a wide variety of sheet properties.

20 Claims, 5 Drawing Sheets

DOUBLE SHEET DETECTOR METHOD FOR AUTOMATED TRANSACTION MACHINE

"This application claims the benefit of U.S. Provisional Application Ser. No. 60/107,900 filed Nov. 10, 1998 and U.S. Provisional Application Ser. No. 60/133,613 filed May 11, 1999.

This application is a continuation-in-part of copending application(s) application Ser. No. 09/135,384 filed on Aug. 17, 1998 which is a continuation in part of application Ser. No. 08/749,260 filed on Nov. 15, 1996, now U.S. Pat. No. 5,923,413.

TECHNICAL FIELD

This invention relates in general to a sensing device with an improved signal to noise ratio for use in an electrically noisy environment. Specifically this invention relates to a synchronized discriminator sensing device for sheet media within an automated transaction machine, including an automated teller machine or any other machine capable of carrying out transfers representative of value.

BACKGROUND ART

Automated transaction machines, and particularly automated teller machines (ATMs) used to carry out banking transactions, are operated using electrical circuitry and components including motors, transformers, relays, solenoids and other actuating devices, all of which generate unwarranted electrical signals or "noise".

One important ATM function is dispensing and receiving sheets. Such sheets may be of several types. A common type of sheet dispensed is currency in the form of currency notes or bills. On occasion two or more bills may adhere to each other due to the surface condition of the bills or humidity or other weather conditions. It is desirable for this condition to be detected before the bills are dispensed. A similar condition may occur in currency receiving machines. Two or more bills adhering together introduces errors into the currency receiving process.

Mechanical thickness detection methods have been developed, but variations in surface characteristics of bills which have been in circulation as compared to new bills make thickness detection for double bills difficult. If detection in a dispensing function is not sensitive enough, multiple bills may be dispensed and a loss incurred by the ATM operator. If detection is too sensitive, thicker single bills will be diverted and not dispensed, causing the ATM to require restocking more frequently than otherwise necessary.

Electrical and optical detection methods are affected by the electrical noise in the ATM environment. Such noise affects the sensitivity at which electrical and optical methods can operate. Signal strength must be high enough that it can be detected above the electrical noise floor in the ATM. Increasing signal strength requires higher power operation. Components with higher ratings are required to operate at higher power without deteriorating sensitivity and to avoid operational problems such as signal saturation.

Radiation type sheet thickness detection devices may have their accuracy adversely affected by differences in sheet coloration. For example, a dark color sheet usually absorbs more radiation than lighter color sheets. Different materials used in currencies of different countries have different radiation absorption properties. This can make it difficult to distinguish between single and multiple sheets. This presents challenges for automated transaction machines which must distinguish between single and multiple sheets having varied radiation absorption and reflectance properties.

Thus there exists a need for an improved sheet thickness detecting device and method for distinguishing between single and multiple sheets dispensed by an automated transaction machine.

DISCLOSURE OF INVENTION

It is an object of the present invention to provide an apparatus and method for use in an automatic transaction machine, for detecting with a sensing device the thickness of sheet media being dispensed or received.

It is a further object of the present invention to provide an apparatus and method for use in an automatic transaction machine, for detecting with a sensing device the thickness of sheet media being dispensed or received, the sensing device including an optical source and an optical detector.

It is a further object of the present invention to provide an apparatus and method for use in an automatic transaction machine, for detecting with a sensing device the thickness of sheet media being dispensed or received, the sensing device including an infrared radiation source and an infrared radiation detector.

It is a further object of the present invention to provide an apparatus and method for use in an automatic transaction machine, for detecting with a sensing device the thickness of sheet media being dispensed, the sensing device including a pulsed optical source and an optical detector.

It is a further object of the present invention to provide an apparatus and method for use in an automatic transaction machine for detecting with a sensing device the thickness of sheet media being dispensed or received, the sensing device including a pulsed optical source and an optical detector synchronized with the optical source.

It is a further object of the present invention to provide an apparatus and method for use in an automatic transaction machine, for detecting with a sensing device the thickness of sheet media being dispensed or received, the sensing device including a pulsed optical source and an optical detector synchronized with the optical source and a discriminator which favors signals synchronized with the source and attenuates other signals.

It is a further object of the present invention to provide an apparatus and method for use in an automatic transaction machine, for detecting with a sensing device the thickness of sheet media being dispensed or received, the sensing device including a pulsed radiation source, a synchronized radiation detector and a discriminator which is both frequency and phase sensitive.

It is a further object of the present invention to provide an apparatus and method for an automatic transaction machine, for detecting with a sensing device the thickness in sheet media being dispensed or received, the sensing device including a pulsed radiation source, a synchronized radiation detector for detecting both a reflected radiation beam and a transmitted radiation beam, and a discriminator which is both frequency and phase sensitive.

It is a further object of the present invention to provide an apparatus and method for use in an automated transaction machine which is operative to reliably distinguish between single and double sheets of sheet media having varied radiation reflectance and absorption properties.

It is a further object of the present invention to provide an apparatus and method for use in an automated transaction machine that is operative to determine the thickness of sheet media that is economical and reliable.

It is a further object of the present invention to provide a method for improving the sensing accuracy of sensing devices used in an automated banking machine.

Further objects of the present invention will be made apparent following the Best Modes for Carrying Out Invention and the appended claims.

The foregoing objects of the present invention are accomplished in an automated transaction machine one preferred embodiment. This exemplary embodiment includes a sheet thickness detector with a synchronized discriminator. The synchronized discriminator in accordance with the exemplary embodiment of the present invention comprises a radiation source, one or more radiation detectors, a preamplifier, a synchronized chopper and an integrator.

The radiation source preferably includes a light emitting diode (LED) pulsed by a driving circuit in a selected sequence. Preferably the LED includes an infrared emitter (IR LED). The IR LED illuminates a first face of a sheet, such as a currency bill, whereupon a portion of the infrared signal is reflected and a portion is transmitted through the sheet. The strength of the reflected beam is proportional to the thickness of the sheet while the strength of the transmitted beam is inversely proportional to the thickness of the sheet. That is, as the number of sheets comprising the sensed sheet media increases, more of the beam will be reflected from the media and less will be transmitted through the media. Further, both the strength of the reflected beam and the strength of the transmitted beam are generally inversely proportional to the darkness (color pattern) of the sensed sheet.

Radiation detectors for the reflective and the transmissive components are preferably photo diodes or photo transistors. In an exemplary embodiment the output of each detector is amplified and delivered to the input of a synchronized chopper circuit which is also referred to herein as a chopper. The chopper is generally synchronized to the pulse pattern driving the LED to process generally only signals synchronized with the LED. The output of the synchronized chopper is processed by an integrator circuit to generate a signal representative of the thickness of the sensed sheet(s).

Alternative embodiments of the invention may include multiple radiation sources positioned on opposed sides of the sheet media. Such embodiments may also include detectors for sensing the level of transmitted and reflected radiation from each radiation source. Each radiation source is preferably driven in a synchronized manner at different times, and the signals processed from the detectors in coordinated relation with the operating period of the radiation source of interest. Signals corresponding to the level of transmitted and reflected radiation from the radiation sources on each side of the sheet media may be combined or otherwise processed to distinguish between single and multiple sheets having varied transmission and reflectance properties. Alternative embodiments where the radiation sources can be separately detected without interference may be operated during overlapping intervals. The principles of the invention may also be used in connection with other types of sensors.

BEST MODES FOR CARRYING OUT INVENTION

Figure 1:
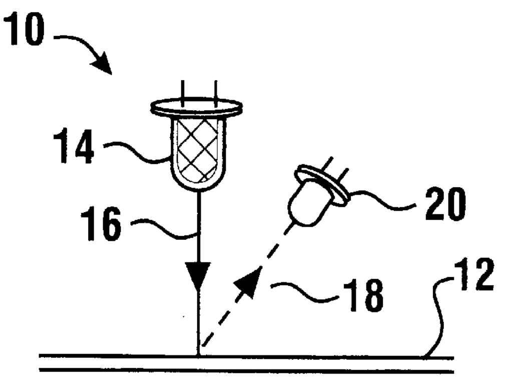
FIG. 1 is a schematic side view of a radiation source and a radiation detector, wherein the detector detects radiation reflected from the surface of sheet media.

Referring now to the drawings and particularly to FIG. 1, there is shown therein a radiation source and reflected radiation detector assembly 10, and a sheet media 12 to be detected. Sheet 12 is typically a currency note, bill, coupon, ticket or other document or sheet representative of value. A radiation source 14 causes radiation schematically indicated 16 to impinge on a face of sheet 12. Reflected radiation schematically indicated 18 is detected or otherwise sensed by detector 20. The signal from detector 20 corresponds to the intensity level of the reflected radiation.

Figure 2:
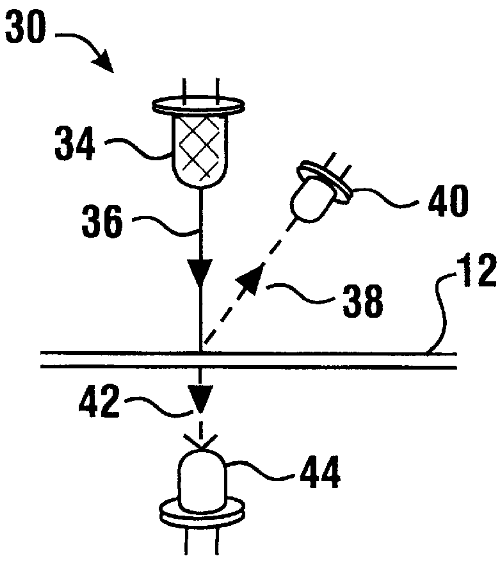
FIG. 2 is a schematic side view of a radiation source, a first radiation detector for detecting radiation reflected from the surface of a sheet, and a second radiation detector for detecting radiation transmitted through the sheet.

Another embodiment of the invention is shown in FIG. 2. This embodiment includes radiation detector assembly 30, including a radiation source 34, a reflected radiation detector 40, a transmitted radiation detector 44 and a sheet medium 12 to be detected. Radiation source 34 causes radiation schematically indicated 36 to impinge on a face of sheet 12. A portion of the radiation 36 will be reflected from an adjacent face surface of the sheet 12 and a portion will be transmitted through the sheet. It is a teaching of the present invention that the strength or intensity level of reflected radiation 38 from a particular area onto which the radiation is directed is generally proportional to the thickness of the sensed sheet 12, while the strength of transmitted radiation 42 is generally inversely proportional to the thickness of the sheet. Both the strength of reflected radiation 38 and the strength of transmitted radiation 42 are generally inversely proportional to the "darkness" or radiation absorption properties of sheet 12 in the area sensed.

In the embodiment shown in FIG. 2 the reflected radiation 38 is detected by a reflectance detector 40. The transmitted radiation 42 is detected by transmittance detector 44. Reflectance detector 40 and transmittance detector 42 each produce signals indicative of the intensity level of radiation sensed. Combining or otherwise processing the two signals as described later herein improves the detection of the thickness of sheet 12 to distinguish a single sheet from a sheet that is a double or other multiple overlapped sheets.

Preferably the sources 14, 34 shown in FIGS. 1 and 2 are light emitting diodes which emit infrared light (IR LEDs). Radiation beams 16, 36, reflected beams 18, 38 and transmitted beam 42 are thus also preferably infrared light. The radiation detectors 20, 40, 44 are preferably photo diodes or photo transistors suitable for detecting infrared light. It should be understood that in other embodiments other types of radiation sources and detector types may be used, including radiation sources in both the visible and non-visible ranges.

Figure 3:
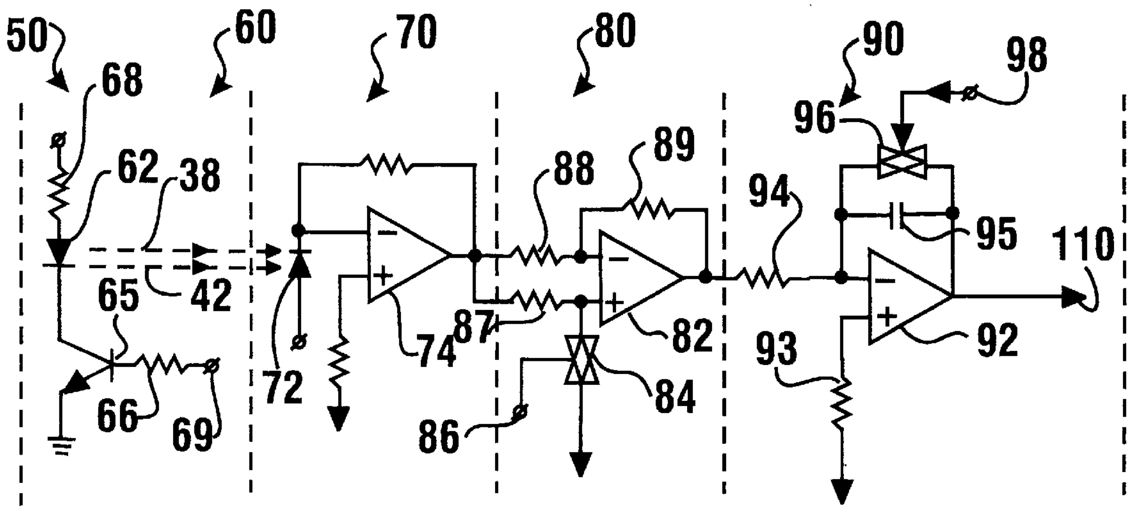
FIG. 3 is a schematic view of exemplary circuitry of a synchronized discriminator having a radiation source driver stage, a pre-amplifier stage, a synchronized chopper stage and an integrator stage.

As shown in FIG. 3 a synchronized discriminator of one exemplary embodiment includes a signal conditioner that comprises a driver 60, a preamplifier 70, a synchronized chopper 80 and an integrator 90.

Figure 4:
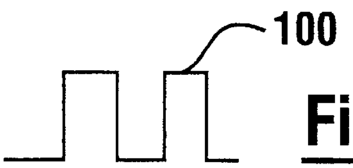
FIG. 4 is a drive signal having a high state and a low state for pulsing the radiation source and detectors shown in FIGS. 1–3.

Driver 60 includes a driver circuit having a transistor 65 and resistors 66, 68. Driver 60 also includes a radiation source 62, which is preferably an IR LED. Source 62 is pulsed responsive to a synchronization signal 100 having a selected pattern. Synchronization signal 100 is applied to the driver at synchronization signal input 69. The wave form of one preferred synchronization signal 100 having a high state and a low state is shown in FIG. 4, but other synchronization signals may be used. For example, a 50% duty cycle pulse train is one such pattern. As described above for FIG. 2, a portion of the radiation generated by source 62 will be reflected from medium 12 as reflected beam 38, and a portion will be transmitted through medium 12 as transmitted beam 42.

Preamplifier stage 70 includes amplifier circuitry shown. It includes a photo diode 72. Photo diode 72 produces signals corresponding to the radiation intensity level sensed. Thus diode 72 may produce signals responsive to reflected beam 38 or transmitted beam 42 . The preamplifier stage further includes an operational amplifier 74. A photo transistor or other signal producing sensing element may also be used in place of photo diode 72. The output of operational amplifier 74 is input to synchronized chopper 80.

Synchronized chopper 80 in the exemplary embodiment includes an operational amplifier 82 with positive input resistor 87, negative input resistor 88 and feedback resistor 89. An analog switch 84 is connected to the positive input of operational amplifier 82. Analog switch 84 is driven at synchronization signal input 86 by synchronization signal 100. When synchronization signal 100 is high, analog switch 84 is on, thereby shorting the positive input of operational amplifier 82 to ground. Shorting the positive input to ground makes operational amplifier 82 an analog inverter having a gain of −1. When synchronization signal 100 is low, analog switch 84 is off and operational amplifier 82 is a unit gain follower having a gain of +1. The output of operational amplifier 82 is input to integrator stage 90.

Integrator 90 of the exemplary embodiment includes operational amplifier 92 with positive input resistor 93, negative input resistor 94 and feedback capacitor 95. Output 110 of integrator 90 results from signal conditioning corresponding to a calculation which favors signals that are generally synchronized with synchronization signal 100. In alternative embodiments a band pass filter may be used in place of integrator 90.

A useful aspect of synchronized discriminator of embodiments of the invention is that any signal not generally synchronized with synchronization signal 100 will be attenuated. Synchronized discriminator 50 of the exemplary embodiment is both frequency and phase sensitive. Unlike a band pass filter alone, which is unable to remove noise within the pass band, the synchronized discriminator 50 of the exemplary embodiment attenuates noise signals which generally do not have both the same frequency and phase as synchronization signal 100.

In the exemplary synchronized discriminator 50 a reset signal 98 to discharge switch 96 across capacitor 95 is used to reset integrator 90. A reset signal is generally provided so that the integrator is reset for each sheet or portion of a sheet to be analyzed.

Output 110 of integrator 90 provides an output of synchronized discriminator 50. The output function of synchronized discriminator 50 can be expressed as $$y(t)=k\int_0^t f(t)g(t)dt$$

where g(t) is the synchronization signal, f(t) is the signal, including noise, detected by photo diode 72, and k is a constant. When synchronization signal is the square wave shape shown in FIG. 4 as synchronization signal 100, g(t) is either +1 or −1 in synchronization discriminator 50. Thus for each passing sheet the synchronized discriminator 50 provides a signal that amplifies signals from the photo diode 72 that are synchronized in frequency and phase with the radiation output by radiation source 62. Other signals which represent noise are attenuated.

It should be understood that the circuitry of synchronized discriminator 50 is exemplary.

In other embodiments other forms of circuitry and signal processing devices may be used to distinguish detector signals that are generally synchronized in frequency and phase with a signal source of interest and to attenuate other signals. The signals produced from radiation detectors 20, 40 and 42 may each be conditioned by a synchronized discriminator. This results in separate output signals representative of transmission and reflectance properties of a sheet in an area where radiation impinges on the sheet. In preferred forms of the invention used in connection with automated transaction machines, the transmissive and reflectance properties of a sheet are sensed as the sheet is moved in a sheet path relative to the radiation source and detectors. The sheets may be preferably moved one at a time in the sheet path by any suitable sheet moving device such as belts, rollers, picking mechanisms or combinations thereof.

The signals output by the synchronized discriminators which are representative of transmission and reflectance properties of sheets may be combined or otherwise processed together to determine those situations where a double or other multiple sheet is moved past the detector, rather than a single sheet. Detection of multiple sheets is often required in automated transaction machines where notes or other sheets are picked from a supply generally one at a time by a picking device for delivery to a user. However, due to a malfunction or other sheet properties, multiple sheets are occasionally picked. Detection of such multiple sheets enables such sheets to be retracted into or diverted in the machine, or their delivery to a user otherwise prevented.

As described above in connection with FIG. 2, the strength of reflected radiation 38 is proportional to the thickness of sheet 12, while the strength of transmitted radiation 42 is inversely proportional to the thickness of sheet 12. Both the strength of reflected radiation 38 and the strength of transmitted beam 42 are inversely proportional to the darkness of sheet 12. Combining the signals corresponding to the strength of reflected beam 38 and transmitted radiation 42 by a weighed difference improves discrimination between detection of a single sheet compared to a double or other multiple sheets comprising sensed sheet 12. The strength of the reflected beam 38 is useful to discern surface color and pattern of the sheet (e.g. the relative darkness of the color of the sensed sheet) and to enhance the discrimination of doubles. As a result the determination of whether a sensed sheet is a single or a double based on combined signals will be more sensitive to thickness and less affected by color.

It can be seen that the synchronized discriminator described herein and its method of operation can also be used for other sensor applications to achieve better signal to noise ratio, higher detection sensitivity, and lower power requirements. The principles of the present invention are particularly useful in applications where ambient noise or signal corruption is a problem.

The signals representative of levels of transmittance and reflectance may be combined or otherwise processed separately or together in varied ways and used to make the determination as to whether a sensed sheet is a single sheet or a double. The approach taken depends on the nature of the sheets detected and the analysis conducted. For example, each of the signals corresponding to transmittance and reflectance values output by a synchronized discriminator may be converted to digital signals by an analog to digital (A/D) converter. The digital signals may then be combined on a weighed basis, compared or otherwise processed together by a processor or other signal processing device in response to programmed instructions. The determination of whether a sensed sheet is a single or double (or other multiple) can be made by a processor based on comparison of a sensed value corresponding to the sensed radiation data, to one or several fixed or programmably changeable thresholds. Generally the approach to combining or evaluating the signals, and the thresholds for making the decision as to whether a sensed sheet is a single or double is determined through experimentation using sheets of the one or more type(s) that are handled by the machine. The reflectance and transmittance signals produced responsive to sheets of the same type in a single or multiple condition enables developing the weighing factors applied to signals and the threshold data that is indicative of sheet conditions and may be used for making the determination of whether a sensed sheet is a single or a double or other multiple.

The processing of transmittance and reflectance signals as digital signals in accordance with programmed instructions provides the advantage that different weighing of signals and differing approaches to signal combination and comparisons to thresholds, can be readily carried out within the same machine responsive to different programmed instructions. The use of such instructions may be selectively triggered by inputs which are indicative of sheet type including for example inputs indicative of the source of the sheet within the machine, devices in a sheet path which determine a type of sheet based on indicia thereon, or user inputs.

It should be understood that while the approach of converting signals representative of sensed reflected and transmitted radiation to digital signals is discussed, other approaches may be used. Circuitry may be provided that weighs and combines the analog signals output by the synchronized discriminators and compares such sensed value output signals to one or more thresholds representative of the detection of doubles or other multiple sheets of a particular type. It should be understood that the references herein to a sensed value that is produced in response to sensed sheet data may be one value or several values, and the references herein to a threshold may be one or several thresholds.

Also in some embodiments of the invention the output of the synchronized discriminators may be combined and processed over substantially the entire length of a passing sheet. This may be done by resetting the integrator in response to detecting the leading edge of sheet. This can be triggered in response to a drop in transmittance value, an increase in reflectance value, or by a separate sensor mechanism which indicates the presence of a sheet adjacent the detector assembly. Likewise the signal is no longer integrated when the sheet ceases to be sensed. Alternatively, signals representative of transmittance and reflectance may be processed over a single portion or multiple selected portions of the sheet that are less than the entire sheet. Alternatively signals corresponding to radiation levels for each detector may be cumulative over a sheet or portion thereof, and the cumulative values weighed, combined or otherwise processed. The approach used will depend on what is deemed appropriate for the particular sheet type to achieve discrimination between single sheets and multiple sheets.

While in the described embodiment the signals from the radiation detectors are processed by the signal conditioners which comprise the synchronized discriminators to produce output signals, which output signals are combined with applied weighing factors, other embodiments may operate differently. For example, signals resulting from the intensities of radiation reflected from and transmitted through a sheet may be weighed and combined before being passed to a signal conditioner which provides an output responsive to synchronization with the periodic intervals when the emitter outputs radiation. Further while signal conditioners described include chopper, amplifier and integrator portions, in other embodiments other forms of signal conditioners may be used.

In some preferred embodiments signal to noise ratio from radiation detectors can be increased by a factor of 100. However, as the signal to noise ratio is increased there is a corresponding increase in integration time. The longer the time period of integration, the greater will be the signal to noise ratio. This is ratio limited by the time that a particular item of sheet media can be detected and the saturation level of the integrator.

Figure 5:
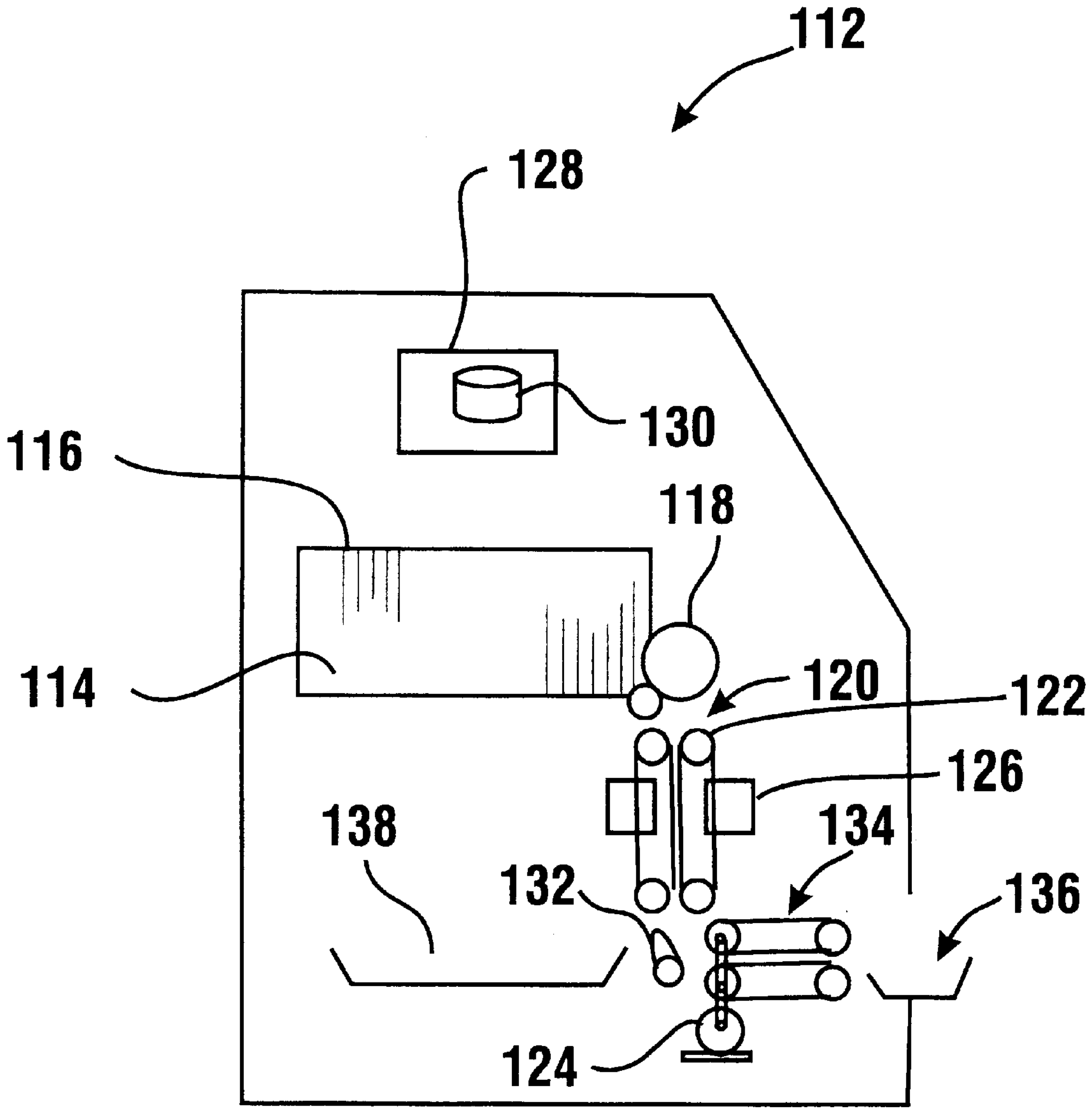
FIG. 5 is a schematic view of an exemplary automated transaction machine including the sheet detecting device of the present invention.

The present invention is preferably used in connection with automated transaction machines. For purposes of this disclosure automated transaction machines include any devices which are used for carrying out transactions involving transfers of value. An exemplary automated transaction machine in which the present invention may be used is an Automated Teller Machine (ATM). FIG. 5 shows a schematic view of an exemplary transaction machine 112 which incorporates an embodiment of the present invention. The transaction machine includes a supply of sheets 114. The sheets are housed in a cassette or canister 116. Sheets are generally removed from the canister one at a time by a picking mechanism 118. The picking mechanism 118 may be of the type generally shown in U.S. Pat. No. 4,494,747 but any of various types of picking mechanisms may be used.

The picking mechanism 118 is operative to selectively deliver sheets one at a time into a sheet path 120. A drive mechanism including opposed belts 122, are operative to move sheets in the sheet path. The drive mechanism 122 is driven by a motor 124 or similar drive device.

The sheet detecting mechanism of the present invention in the exemplary machine is schematically indicated 126. The sheet detecting mechanism 126 extends adjacent to the sheet path and is operative to sense radiation transmitted through and reflected from sheets passing in a detection area therein.

The sheet detecting mechanism 126 is in operative connection with a processor schematically indicated 128. The processor 128 has a data store 130 in operative connection therewith. In this exemplary embodiment the processor is operative to receive the output signals corresponding to the radiation intensity values. The processor is operative to calculate a sensed value corresponding to the output signals which may include one or more values. The sensed value is compared to one or more thresholds which are determined based on data stored in the data store.

In response to the relationship of at least one sensed value and at least one threshold the processor 128 operates in accordance with its programming to make a determination whether the sensed sheet is a single sheet suitable for delivery to a user, or is a double or other multiple sheet which should be diverted and maintained within the machine. The processor 128 is in operative connection with a diverter which includes a gate schematically indicated 132. When the sheet sensed is a single bill the diverter gate is positioned as shown in FIG. 5. As a result sheets are directed to a second portion of the sheet path schematically indicated 134. The second portion of the sheet path 134 terminates in a delivery area 136. Sheets are delivered from the delivery area to the user of the machine.

If the sensed value determined based on the radiation intensities sensed by the sheet detecting mechanism indicate that the sheet moving in the sheet path is a double or other multiple or an improper sheet, the processor 128 is operative to cause the diverter gate 132 to move to a position in which sheets are directed away from the second portion of the sheet path. Instead the diverter gate is operative to direct sheets into a divert bin 138. Sheets are stored in the divert bin until they may be removed by authorized personnel accessing the interior of the automated transaction machine.

It should be understood that while the described embodiment of the automated transaction machine is an automated teller machine, the present invention may be used with a variety of types of automated transaction machines which dispense or accept sheet materials which have radiation properties which vary with thickness. Further while the described embodiment uses radiation for purposes of determining sheet thickness, in other embodiments other types of sensors may be used. For example for appropriate sheets, sonic, optic and other types of emitters and sensors may provide a suitable indication of sheet status. In addition the principles of the invention may also be applied to attenuate extraneous signals from mechanical types of detectors including those which sense sheet thickness using members that contact the sheets.

Figure 6:
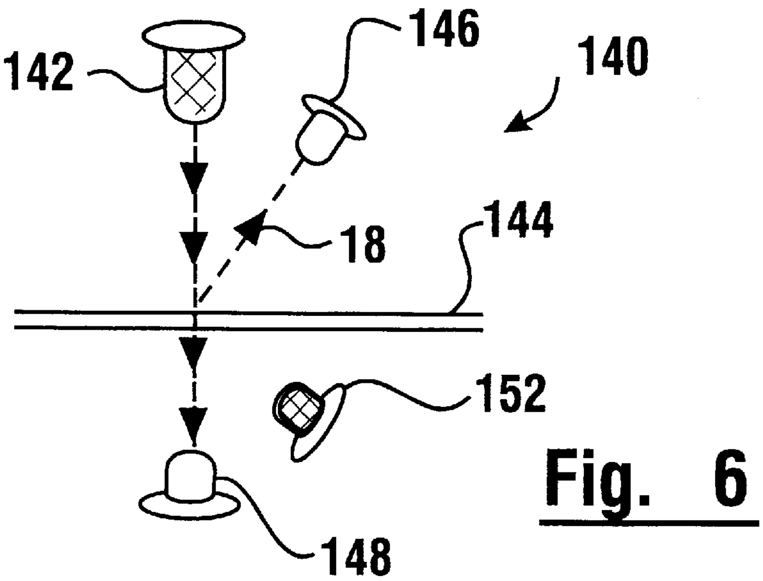
FIG. 6 is a schematic view of a first alternative embodiment of the invention including two radiation emitters, a first emitter generating radiation which impinges on a sheet.
Figure 7:
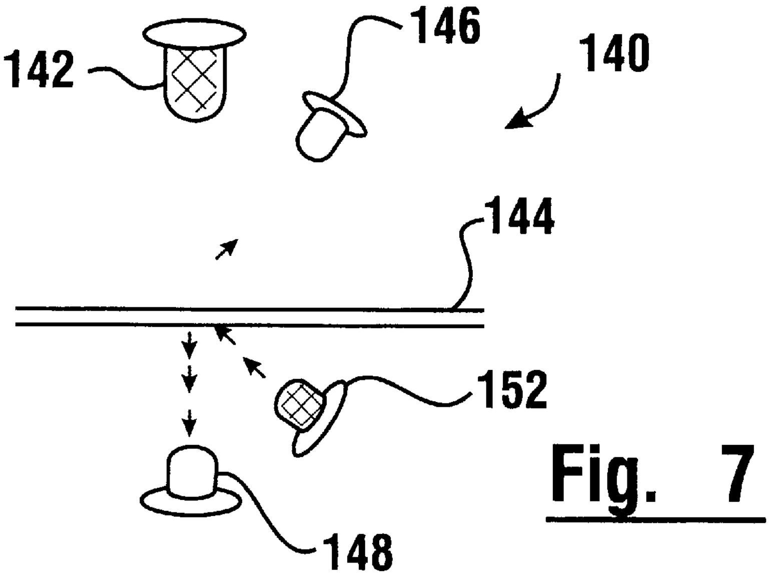
FIG. 7 is a schematic view of the alternative embodiment shown in FIG. 6 with the alternative emitter indicated as emitting radiation.

FIG. 6 shows an arrangement of radiation emitters and detectors in an alternative exemplary embodiment of a sheet detecting apparatus of the present invention. This alternative arrangement generally referred to as 140 includes a first radiation source indicated by an emitter 142. Radiation emitter 142 is positioned on a first side of a sheet 144. A first radiation detector 146 is positioned on the same side of the sheet as emitter 142. Another radiation detector 148 is positioned on an opposed side of the sheet 144 from the emitter 142.

Figure 8:
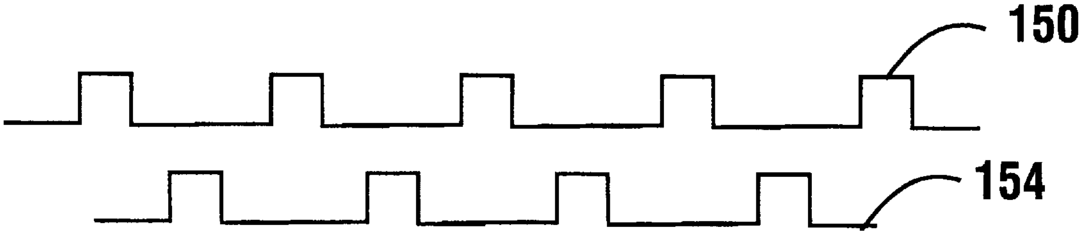
FIG. 8 is a schematic view showing the wave forms used to drive the emitters in the embodiment shown in FIG. 6, the wave forms being indicative of the periodic intervals the emitters generate radiation.

As shown in FIG. 6 when emitter 142 emits radiation the radiation which impinges on a face of the sheet, the radiation is partially reflected and sensed by detector 146. Another portion of the radiation is transmitted through the sheet and detected by detector 148. Detector 142 is driven to emit radiation at periodic intervals. The periodic intervals are schematically indicated by the positive pulses shown in the wave form indicated 150 in FIG. 8.

Embodiment 140 also includes a further radiation source represented by emitter 152. Emitter 152 is disposed on an opposed side of the sheet 144 from emitter 142. Emitter 152 is positioned such that radiation emitted therefrom impinges on an opposed face of the sheet 144 as the sheet moves in a sheet path. A portion of the radiation from emitter 152 is reflected to detector 148. A small portion of the radiation from emitter 152 is also transmitted through the sheet. However due to the angle of incidence of radiation from emitter 152 in the configuration shown, relatively little radiation passes through the sheet and the transmitted radiation from this emitter is not analyzed in this embodiment.

Emitter 152 is operated by a driving signal to emit radiation at second periodic intervals. The second periodic intervals are represented by a wave form 154 in FIG. 8. It should be noted that the wave form 154 is preferably out of phase with the wave form 150 so that emitter 142 is generally not emitting radiation at the same time as emitter 152. However in other embodiments where the emitters are emitting different types of radiation such that the detector(s) for one emitter are not substantially influenced by radiation from the other emitter the wave forms may be overlapping.

Figure 9:
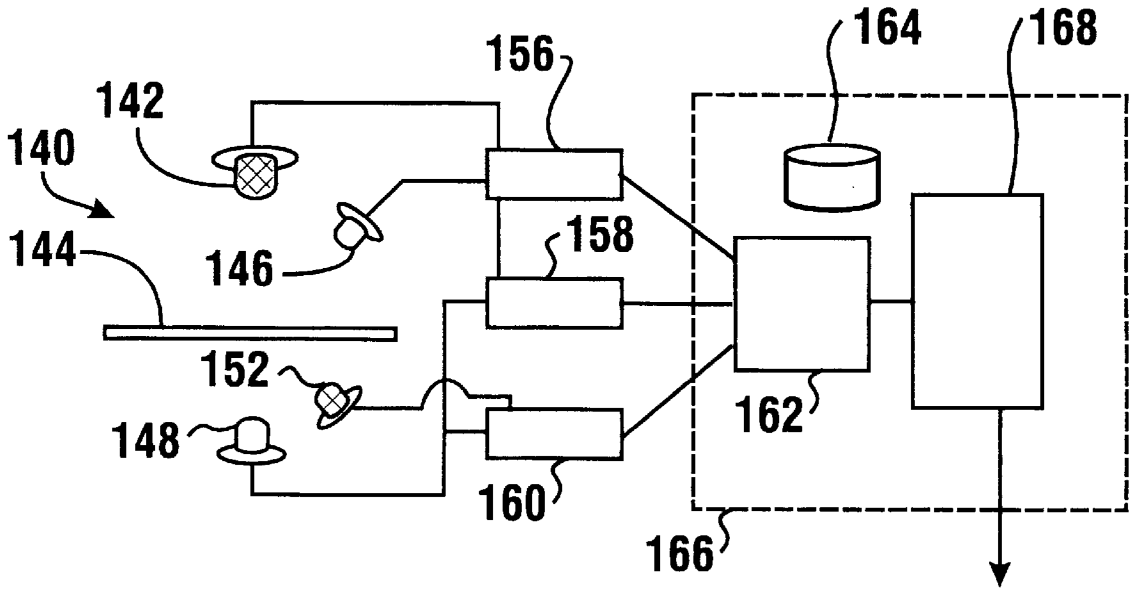
FIG. 9 is a schematic view of the signal conditioning, weighing, combining and comparing components used in connection with the embodiment shown in FIG. 6.

FIG. 9 schematically indicates the components of the signal conditioning and analysis devices used in connection with the alternative embodiment 140. Detector 146 is in operative connection with a first signal conditioner 156. Signal conditioner 156 may include comparable components to the synchronized discriminator previously described or other suitable signal conditioning circuitry. The signal conditioner may include or be connected to a driver which drives emitter 142 to emit radiation at the first periodic intervals represented by the wave form 150. The signal conditioner 156 is operative to synchronize the sensed signals from detector 146 with the emission of radiation by the emitter 142 with a chopper or other device. The signal conditioner 156 may also include an amplifier portion and an integrator portion similar to the synchronizing discriminator previously described to amplify and integrate signals responsive to the radiation sensed by detector 146. In some embodiments of the invention the signal conditioner 156 may be operative to integrate signals corresponding to the sensed radiation signals from a detector during the periodic intervals which span the time period that the sheet 144 is in a detection area of the sheet path adjacent to the detectors and emitters in the sheet path. Of course in alternative embodiments integration over less than the entire length of the sheet may be used.

While signal conditioner 156 may include components similar to or which function the same as those of the synchronizing discriminator, the signal conditioner 156 may also include other components. Such components may include for example an analog to digital converter, a processor or other circuitry or components which operate to sample and pass only signals corresponding to radiation detected during times emitter 142 emits radiation and to attenuate or disregard other signals. The components of the signal conditioner 156 will also depend on the nature of the emitters and sensors used as well as perhaps the characteristics of the sheets. It should also be mentioned that realistically the period during which radiation signals from sensor 146 or the other sensors are sampled and analyzed need not necessarily perfectly correspond to the periodic intervals when emitter is emitting radiation. Rather it is sufficient that the signals from the detectors be analyzed generally during only the time periods that the emitter of interest is generating radiation. Favorable results may still be obtained when the period of signal analysis is less than the period of emission by the emitter and/or is not perfectly in phase therewith.

As represented in FIG. 9, detector 148 is in operative connection with a signal conditioner 158. Signal conditioner 158 in the described embodiment may be similar to signal conditioner 156. Signal conditioner 158 is operative to produce an output responsive to radiation sensed by detector 148 during the intervals that emitter 142 emits radiation. Like signal conditioner 156 signal conditioner 158 is operative to produce an output corresponding to the radiation sensed by detector 148 during a selected time period.

Emitter 152 and detector 148 are also operatively connected to a signal conditioner 160. Signal conditioner 160 is operative to produce a drive signal or is otherwise in operative connection with a source of a drive signal which causes emitter 152 to generate radiation in accordance with the wave form 154 shown in FIG. 8. Signal conditioner 160 is generally similar to signal conditioners 156 and 158. However the output it produces is representative of the light reflected by the sheet from emitter 152 during the second periodic intervals during which emitter 152 is operative to produce radiation.

As will be appreciated the sheet detector configuration 140 is operative to provide an indication of the "darkness" or absorption of radiation on both sides of the sheet. Because the magnitude of reflected radiation is inversely proportional to the darkness of the sheet media. Having data available concerning reflectance from each side of the sheet is useful in detecting doubles of some types of sheets.

In the exemplary embodiment the outputs from the signal conditioners 156, 158 and 160 are in operative connection with a combining device schematically indicated 162. The combining device is operative to apply weighing factors to the output signals and/or to combine the signals in ways suitable for the detection of doubles in accordance with data stored in a data store schematically indicated 164. The combining device 162 in the described exemplary embodiment is included as part of a functional component in software which operates in a processor schematically indicated 166. Of course it should be understood that in other embodiments other types of signal combining and weighing devices may be used.

The combining device is operative to apply the output signal information to produce a sensed value which includes one or more values or signals that are the result of combining the output from the signal conditioners. The sensed value is then delivered to a comparator component 168. The comparator component is operative to determine the relationship of the sensed value relative to a threshold, which threshold may include one or more thresholds which are indicative of conditions such as single sheets, double sheets, triple sheets and so on. In other embodiments the threshold may be used to distinguish a single sheet from a multiple sheet. In other embodiments the threshold may be used to distinguish a single sheet from a multiple sheet. It should be understood that the combining device and comparator may operate together in some embodiments to adjust both the sensed value and the threshold responsive to the output signals from the signal conditioners. For example outputs indicative of high "darkness" on the sides of the sheet may operate to adjust a threshold such that the relatively lower amount of radiation that is sensed as passing through the sheet does not indicate double sheets in these circumstances whereas a similar amount of radiation passing through sheets with a lesser degree of "darkness" would be indicative of doubles. Various approaches to combining the outputs from the signal conditioners and adjusting the relationship of the sensed value and the threshold may be used depending on the particular sheets being sensed and the programming of the system. These approaches to combining and weighing outputs and setting and adjusting thresholds are preferably established based on experimentation with single and multiple sheets of the types(s) to be detected with the apparatus to determine the range and type of signals obtained from acceptable single sheets and multiple or overlapped sheets.

The comparator 168 is operative to output signals responsive to comparing the relationship between the sensed value and the threshold. If the comparator determines the probable existence of a double sheet the signals output by the comparator are operative to cause appropriate action to be taken in the machine. This may include for example actuating the diverter 132 shown in FIG. 5 to direct the double sheets to the divert bin 138.

It should be understood that the arrangement and types of components shown in FIG. 9 are exemplary and that other arrangements of hardware and software devices may be used in other embodiments of the invention. It should further be understood that the form of the invention described herein with one emitter and two detectors may also have the form shown in FIG. 9. Of course the third signal conditioner 160 would not be used in such embodiments and the combining device would operate to combine the synchronized signals output by the other two signal conditioners. It should further be understood that while in connection with embodiments herein the radiation output by emitters is sometimes described as a beam and is generally shown as linear, radiation sources and the radiation patterns output thereby may have various forms including conical, fan-shaped or other suitable shapes for impingement on sheets passing in a sheet path. It should be understood that in embodiments of the invention emitters used may produce radiation at generally a single frequency or at multiple frequencies. In alternative embodiments which employ emitters that produce substantially different types of detecting signals so that they may be operated simultaneously, different or additional detectors may be provided on each side of the sheet to detect the signals from the corresponding emitter.

Figure 10:
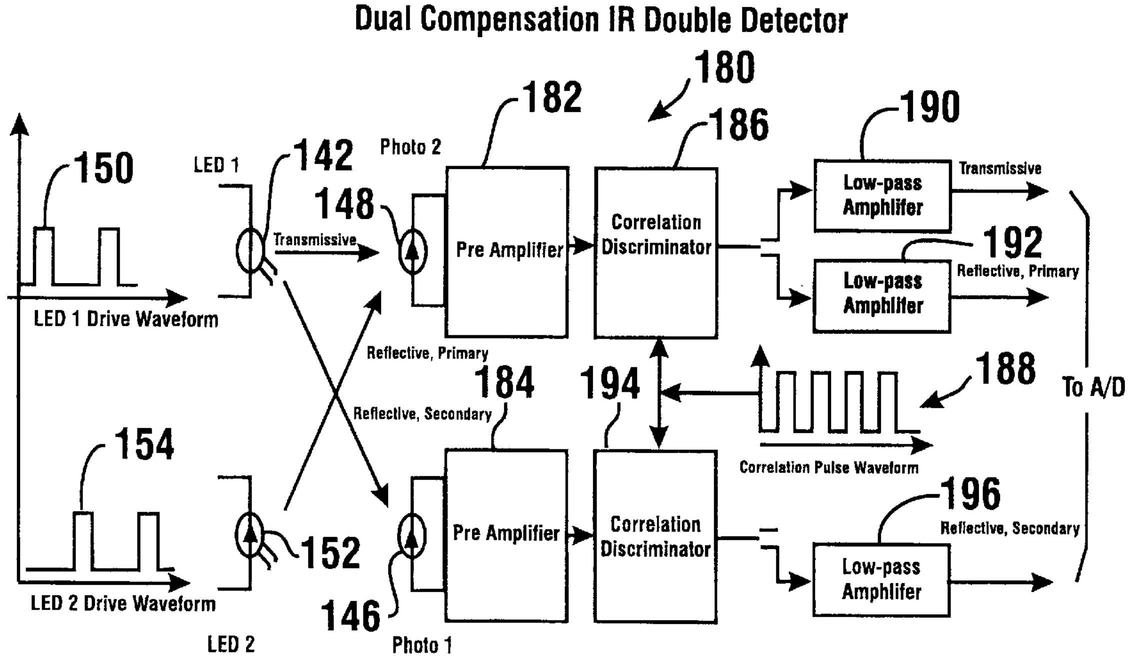
FIG. 10 is a schematic view of exemplary signal conditioning components used in an alternative embodiment of the invention.

FIG. 10 shows a system 180 which is generally similar to the system 140 in FIG. 9 but which employs alternative signal conditioning devices and techniques. In system 180 radiation sources 142 and 152 are driven by generally nonoverlapping drive signals 150 and 154, respectively. As in the prior embodiment detector 148 senses the level of transmitted radiation through a sheet from source 142 as source 142 is driven responsive to drive signal 150. Detector 148 also senses the level of radiation reflected from an opposed face of the sheet from source 152 as source 152 is driven by signal 154. Detector 146 which is on the same side of the sheet path as source 142, senses the level of reflected radiation from the adjacent face of the sheet as source 142 is driven responsive to drive signal 150.

In system 180 a preamplifier 182 amplifies and converts current signals produced by a photo diode used as detector 148, and converts the current to a voltage signal. A preamplifier 184 likewise amplifies and converts current signals from a photo diode used as detector 146 and produces a voltage signal in response thereto.

The output of preamplifier 182 is delivered to a correlation discriminator 186. The correlation discriminator 186 works in a switching mode to filter out noise and interference by frequency and phase. The switching is accomplished in response to a correlation pulse wave form 188 which corresponds to a combination of wave forms 150 and 154. The switching of correlation discriminator 186 responsive to correlation pulse wave form 188 demultiplexes the transmissive signal and the reflective signals produced responsive to the transmitted and reflected radiation sensed by detector 148.

The signal corresponding to the radiation level sensed as transmitted through the sheet to detector 148 is passed to a low pass filter/amplifier 190. The signal corresponding to the radiation level sensed as reflected from the sheet to detector 148 is passed to a low pass filter amplifier 192. The outputs of filter amplifiers 190 and 192 are output to one or more analog to digital converters in the exemplary embodiment. This results in at least one value indicative of the radiation levels sensed by detector 148 which may be subject to comparison, application of weighing factors or further processing to discriminate between single and multiple sheets.

The output of preamplifier 184 corresponding to the level of radiation sensed by detector 146 is delivered to a correlation discriminator 194. The correlation discriminator 194 is driven in a switching mode by the pulse wave form 188 and preferably operates to pass signals corresponding in frequency and phase to the pulses driving source 142. This filters out noise by passing only those signals which are synchronized in both frequency and phase with the driving wave form.

The output of synchronized discriminator 194 is delivered to a low pass filter amplifier 196. The output of filter amplifier 196 which is indicative of the level of radiation reflected from the face of the note adjacent source 142, is then passed in this embodiment to one or more analog to digital converters. The corresponding digital signal is then combined, weighed and/or processed with the other signals for purposes of determining whether the sheet sensed is a single sheet or a multiple sheet.

In this exemplary embodiment the digital signals corresponding to each signal representing the level of transmission through the sheet is accumulated to produce a cumulative transmission value representative of radiation transmitted through the sheet or portion thereof being analyzed. Likewise each of the values of reflectance from the faces of the sheet are combined to produce respective cumulative reflectance values. These values are indicative of reflectance across the faces of the sheet in the portions being analyzed. These cumulative values may then be processed by applying weighing factors which apply the principal that less radiation will be transmitted through the sheet when the color of the sheet is dark as sensed by the reflectance values. The weighing factors are also preferably applied to implement the principal that the level of reflectance from the sheets are higher with increasing thickness of the sheet indicative of a multiple sheet. After application of the weighing factors which apply the principals discussed, the values may be individually compared to thresholds or combined into one or more values and compared to one or more thresholds for purposes of reaching a determination as to whether the sheet sensed is a single or multiple sheet.

Alternative approaches may include weighing and combining sets of individual transmission and reflectance values so as to compensate for each local area of a sheet being sensed. This may involve weighing and combining the values in a set including a single transmission and two reflectance values. Alternatively it may involve combining and weighing groups of reflectance and transmission values. Using these approaches values may be produced which may be compared to thresholds a plurality of times during the course of sensing a note. A conclusion as the result of these comparisons may then be used for purposes of making the determination as to whether the sheet is a single or a multiple sheet as will be apparent. Various approaches may be taken to combining, weighing and processing the signals from the detectors for purposes of making comparisons to thresholds and determining if the sensed sheet is a single or multiple sheet.

It should be mentioned that numerous embodiments are within the scope of the present invention. Embodiments of the invention may be used to pass sheets which are single sheets and to divert or otherwise prevent delivery of multiple sheets which are fully or partially overlapped. Because embodiments of the invention can be used to give an indication of sheet thickness, embodiments of the invention may be used to pass identifiable multiple bills in circumstances where to do so would be acceptable. This may be done in a manner similar to that. previously done using mechanical thickness detectors such as is shown in U.S. Pat. Nos. 4,464,369 and 4,462,587 which are owned by the assignee of the present invention and the disclosures of which are incorporated by reference herein.

Figure 11:
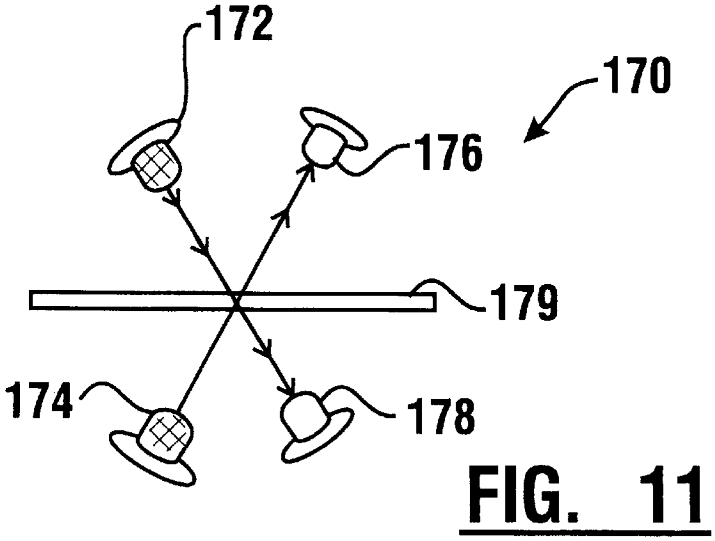
FIG. 11 is a schematic view of emitters and detectors used in connection with a further alternative embodiment of the invention.

FIG. 11 shows yet another alternative arrangement for emitters and detectors in a sheet detecting device of the invention. This further alternative arrangement generally indicated 170 includes an emitter 172 and an emitter 174. The alternative arrangement further includes a detector 176 disposed on the same side of the sheet path as emitter 172. A detector 178 is disposed on the same side of the sheet path as emitter 174. A detected sheet is schematically indicated 179. As sheets pass between the emitters and detectors in the sheet path, emitter 172 and emitter 174 are driven to emit radiation in preferably generally non-overlapping first and second periodic intervals. When emitter 172 emits radiation, signals from detectors 176 and 178 are conditioned and synchronized therewith to analyze the transmission and reflectance properties of the sheet due to radiation impinging on the sheet from the first side of the sheet path. During the generally non-overlapping second periodic intervals when emitter 174 emits radiation, detector 178 and detector 176 sense the intensity of radiation reflected and transmitted respectively from emitter 174 on the opposed side of the sheet path from emitter 172.

As will be appreciated the alternative arrangement 170 produces four output signals which may be weighed, combined or otherwise analyzed for purposes of determining if an adjacent sheet has properties which correspond to a single, double or other multiple sheet. The weighing of signals and determination of thresholds for purposes of deciding on sheet conditions are preferably accomplished based on data obtained experimentally with the sheets of interest. Of course as will be appreciated other numbers and types of detectors and other arrangements of emitters and detectors may be used in other embodiments of the invention. Also, as discussed with other embodiments, if the emitters used are of types that are sufficiently different in the frequency of radiation or other signals emitted, it may be acceptable to have the periods where the emitters are operated and sensed overlapping to a substantial degree.

Thus the new apparatus and method of the present invention achieves the above stated objectives, eliminates difficulties encountered in the use of prior devices and systems, solves problems and attains the desirable results described herein.

In the foregoing description certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art as capable of performing the recited function, and shall not be limited to the structures shown herein or mere equivalents.

Having described the features, discoveries and principles of the invention, the manner in which it is constructed and operated, and the advantages and useful results attained, the new and useful structures, devices, elements, arrangements, parts, combinations, systems, equipment, operations and relationships are set forth in the appended claims.

We claim:

1. A method for distinguishing a single sheet from a multiple sheet comprised of a plurality of overlapping sheets, comprising the steps of:

(a) illuminating a first face of a sheet with a first radiation source positioned on a first side of the sheet;

(b) sensing with a detector on a first side of the sheet, a first level of radiation from the first radiation source reflected from the first face of the sheet;

(c) sensing with a detector positioned on a second side of the sheet, a second level of radiation from the first radiation source transmitted through the sheet;

(d) illuminating a second face of the sheet with a second radiation source positioned on a second side of the sheet;

(e) sensing with a detector on the second side of the sheet, a third level of radiation from the second radiation source reflected from the second face of the sheet;

(f) generating at least one value responsive to the first level, the second level and the third level;

(g) comparing the at least one value to at least one threshold, wherein a relationship of the at least one value to the at least one threshold is indicative of whether the sheet is a single sheet or a multiple sheet.

2. A method of distinguishing a single sheet from a multiple sheet comprised of a plurality of overlapping sheets, comprising:

(a) illuminating a first face of a sheet with a first radiation source positioned on a first side of the sheet;

(b) sensing with a first detector on a first side of the sheet, a first level of radiation from the first radiation source reflected from the first face of the sheet;

(c) sensing with a second detector positioned on a second side of the sheet, a second level of radiation from the first radiation source transmitted through the sheet;

(d) illuminating a second face of the sheet with a second radiation source positioned on a second side of the sheet;

(e) sensing with the second detector on the second side of the sheet, a third level of radiation from the second radiation source reflected from the second face of the sheet;

(f) generating at least one value responsive to the first level, the second level and the third level;

(g) comparing the at least one value to at least one threshold, wherein a relationship of the at least one value to the at least one threshold is indicative of whether the sheet is a single sheet or a multiple sheet.

3. The method according to claim 1 wherein steps (b) and (c) are carried out during a first time interval, and step (e) is carried out during a second time interval.

4. The method according to claim 3 wherein the first time interval and the second time interval are non-overlapping.

5. The method according to claim 1 wherein the sheet has generally non-uniform indicia printed on each of the first face and the second face, and further comprising the step of:

moving the sheet in a sheet path through a detection area, and wherein steps (a) through (e) are each performed a plurality of times as the sheet moves through the detection area.

6. The method according to claim 5 and further comprising the steps of:

producing a first reflectance value responsive to each of a plurality of first levels sensed during performance of step (b), and combining a plurality of first reflectance values to produce a cumulative first reflectance value for the sheet.

7. The method according to claim 5 and further comprising the steps of:

producing a transmission value responsive to each of a plurality of second levels produced during performance of step (c), and combining a plurality of transmission values to produce a cumulative transmission value for the sheet.

8. The method according to claim 6 and further comprising the steps of:

producing a transmission value responsive to each of a plurality of second levels produced during performance of step (c), combining a plurality of transmission values to produce a cumulative transmission value for the sheet, and wherein step (f) comprises applying at least one weighing factor to at least one of the cumulative reflectance value and cumulative transmission value.

9. The method according to claim 6 and further comprising the steps of:

producing a transmission value responsive to each of a plurality of second levels produced during performance of step (c);

combining a plurality of transmission values to produce a cumulative transmission value for the sheet, producing a second reflectance value responsive to each of a plurality of third levels produced during performance of step (e);

combining a plurality of second reflectance values to produce a cumulative second reflectance value for the sheet.

10. The method according to claim 9 wherein step (f) includes applying a weighing factor to at least one of the cumulative first reflectance value, cumulative second reflectance value and the cumulative transmission value.

11. The method according to claim 10 wherein in step (f) the weighing factor is applied such that an increase in at least one of the cumulative first reflectance value and cumulative second reflectance value is operative to cause the relationship of the at least one value and at least one threshold compared in step (g) to tend toward an indication of a multiple sheet.

12. The method according to claim 5 wherein steps (b) and (c) are performed during each of a plurality of first periodic intervals and step (e) is performed during a plurality of second periodic intervals, wherein the first periodic intervals are generally non-overlapping with the second periodic intervals.

13. The method according to claim 1 wherein in step (f) the at least one value is generated by application of at least one weighing factor to at least one output corresponding to at least one of the first level, the second level and the third level.

14. The method according to claim 13 wherein the at least one weighing factor is applied such that an increase in an output corresponding to an increase in the first level or an increase in the third level changes the relationship toward an indication of a multiple sheet in step (g).

15. The method according to claim 1 wherein the first radiation source comprises an infrared radiation source.

16. A method of distinguishing a single sheet from a multiple sheet comprised of a plurality of overlapping sheets, comprising:

(a) illuminating a first face of a sheet with a first radiation source positioned on a first side of the sheet;

(b) sensing with a detector on a first side of the sheet, a first level of radiation from the first radiation source reflected from the first face of the sheet;

(c) sensing with a detector positioned on a second side of the sheet, a second level of radiation from the first radiation source transmitted through the sheet;

(d) illuminating a second face of the sheet with a second radiation source positioned on a second side of the sheet, wherein at least one of the first radiation source and the second radiation source comprises an infrared radiation source;

(e) sensing with a detector on the second side of the sheet, a third level of radiation from the second radiation source reflected from the second face of the sheet;

(f) generating at least one value responsive to the first level, the second level and the third level;

(g) comparing the at least one value to at least one threshold, wherein a relationship of the at least one value to the at least one threshold is indicative of whether the sheet is a single sheet or a multiple sheet.

17. A method of distinguishing a single sheet from a multiple sheet comprised of a plurality of overlapping sheets, comprising:

(a) illuminating a first face of a sheet with a first radiation source positioned on a first side of the sheet;

(b) sensing with a detector on a first side of the sheet, a first level of radiation from the first radiation source reflected from the first face of the sheet;

(c) sensing with a detector positioned on a second side of the sheet, a second level of radiation from the first radiation source transmitted through the sheet;

(d) illuminating a second face of the sheet with a second radiation source positioned on a second side of the sheet;

(e) sensing with a detector on the second side of the sheet, a third level of radiation from the second radiation source reflected from the second face of the sheet;

(f) generating at least one value responsive to the first level, the second level and the third level;

(g) comparing the at least one value to at least one threshold, wherein a relationship of the at least one value to the at least one threshold is indicative of whether the sheet is a single sheet or a multiple sheet;

(h) moving the sheet along a sheet path; and (i) diverting the sheet from the sheet path responsive to the relationship of the at least one value and the at least one threshold compared in step (g) being indicative that the sheet is a multiple sheet.

18. An apparatus comprising:

a sheet, wherein the sheet comprises a first face and a second face;

at least one first radiation source on a first side of the sheet;

at least one first detector on the first side of the sheet, wherein the at least one first detector is operable to sense a first level of radiation from the at least one first radiation source reflected from the first face of the sheet;

at least one second radiation source on a second side of the sheet opposed of the first side;

at least one second detector on the second side of the sheet, wherein the at least one second detector is operable to sense a second level of radiation from the at least one first radiation source transmitted through the sheet and to sense a third level of radiation from the at least one second radiation source reflected from the second face of the sheet;

at least one processor in operative connection with the at least one first radiation source, the at least one first detector, the at least one second radiation source, and the at least one second detector, wherein the at least one processor is operable to distinguish the sheet as a single sheet or as a multiple sheet comprised of plural overlapping sheets.

19. The apparatus according to claim 18 and further comprising:

a sheet path, wherein the sheet moves in the sheet path;

a diverter in connection with the sheet path, wherein the diverter is in operative connection with the at least one processor;

wherein the at least one processor is operative responsive to the sheet being distinguished as a multiple sheet to cause the diverter to operate to divert the sheet from the sheet path.

20. A method for distinguishing a single sheet from a multiple sheet comprised of a plurality of overlapping sheets, comprising the step of:

(a) illuminating a first face of a sheet with a first radiation source positioned on a first side of the sheet;

(b) sensing with a detector on a first side of the sheet, a first level of radiation from the first radiation source reflected from the first face of the sheet;

(c) sensing with a detector positioned on a second side of the sheet, a second level of radiation from the first radiation source transmitted through the sheet;

(d) illuminating a second face of the sheet with a radiation source positioned on a second side of the sheet;

(e) sensing with a detector on the second side of the sheet a third level of radiation from the second radiation source reflected from the second face of the sheet; and (f) determining if the sheet is a single sheet or a multiple sheet responsive to the first level, the second level and the third level.

* * * * *